US009570221B2

(12) United States Patent
Altknecht et al.

(10) Patent No.: US 9,570,221 B2
(45) Date of Patent: Feb. 14, 2017

(54) PERMANENT MAGNETIC CHUCKING DEVICE WITH LARGE FORCE DIFFERENTIAL

(71) Applicant: International Business Machines Corporation, Armonk, NY (US)

(72) Inventors: David J. Altknecht, San Jose, CA (US); James Best, San Jose, CA (US); William M. Dyer, San Jose, CA (US); Pierre-Olivier Jubert, San Jose, CA (US); Ronald R. Labby, San Jose, CA (US); Gary M. McClelland, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 14/529,088

(22) Filed: Oct. 30, 2014

(65) Prior Publication Data

US 2016/0125989 A1    May 5, 2016

(51) Int. Cl.
  *H01F 7/04*   (2006.01)
  *H01F 7/02*   (2006.01)
  *G11B 15/66*  (2006.01)
  *G11B 15/67*  (2006.01)

(52) U.S. Cl.
  CPC .............. *H01F 7/04* (2013.01); *G11B 15/662* (2013.01); *G11B 15/67* (2013.01); *G11B 15/672* (2013.01); *H01F 7/0252* (2013.01)

(58) Field of Classification Search
  CPC .... B25B 11/002; H01F 7/0252; H01F 7/0226; H01F 7/04; H01F 7/1607; H01F 2007/086; H01H 51/065; H01H 50/36
  USPC ................................ 335/285, 288, 289, 295
  See application file for complete search history.

(56) References Cited

U.S. PATENT DOCUMENTS

| 2,360,928 A | 10/1944 | Beechlyn et al. |
| 4,575,702 A | 3/1986 | Nitta et al. |
| 5,266,914 A | 11/1993 | Dickson et al. |
| 6,076,873 A * | 6/2000 | Jung ............................ 294/65.5 |
| 6,707,360 B2 * | 3/2004 | Underwood et al. ......... 335/288 |
| 6,879,231 B2 | 4/2005 | Menard |
| 7,161,451 B2 | 1/2007 | Shen |
| 7,224,251 B2 * | 5/2007 | Wang ............................ 335/285 |
| 8,217,743 B2 | 7/2012 | Liu |
| 2001/0026204 A1 * | 10/2001 | Petro ............................ 335/229 |
| 2010/0328001 A1 * | 12/2010 | Harjes .......................... 335/285 |

OTHER PUBLICATIONS

Berman et al., U.S. Appl. No. 14/108,279, filed Dec. 16, 2013.

* cited by examiner

*Primary Examiner* — Bernard Rojas
(74) *Attorney, Agent, or Firm* — Zilka-Kotab, PC

(57) ABSTRACT

An apparatus usable as a chucking device to temporarily couple two mechanical objects together. In one embodiment, the apparatus includes an arbor configured to receive an at least partially ferromagnetic object; and a magnet assembly. The magnet assembly includes multiple permanent magnets mounted in a soft ferromagnetic enclosure. The magnet assembly is rotatably coupled to the arbor such that the magnet assembly and the arbor are positionable relative to one another in locking and unlocking positions upon relative rotation therebetween. The magnet assembly is configured to exert a pulling force on the object in the locking position and a lesser force in the unlocking position.

27 Claims, 13 Drawing Sheets

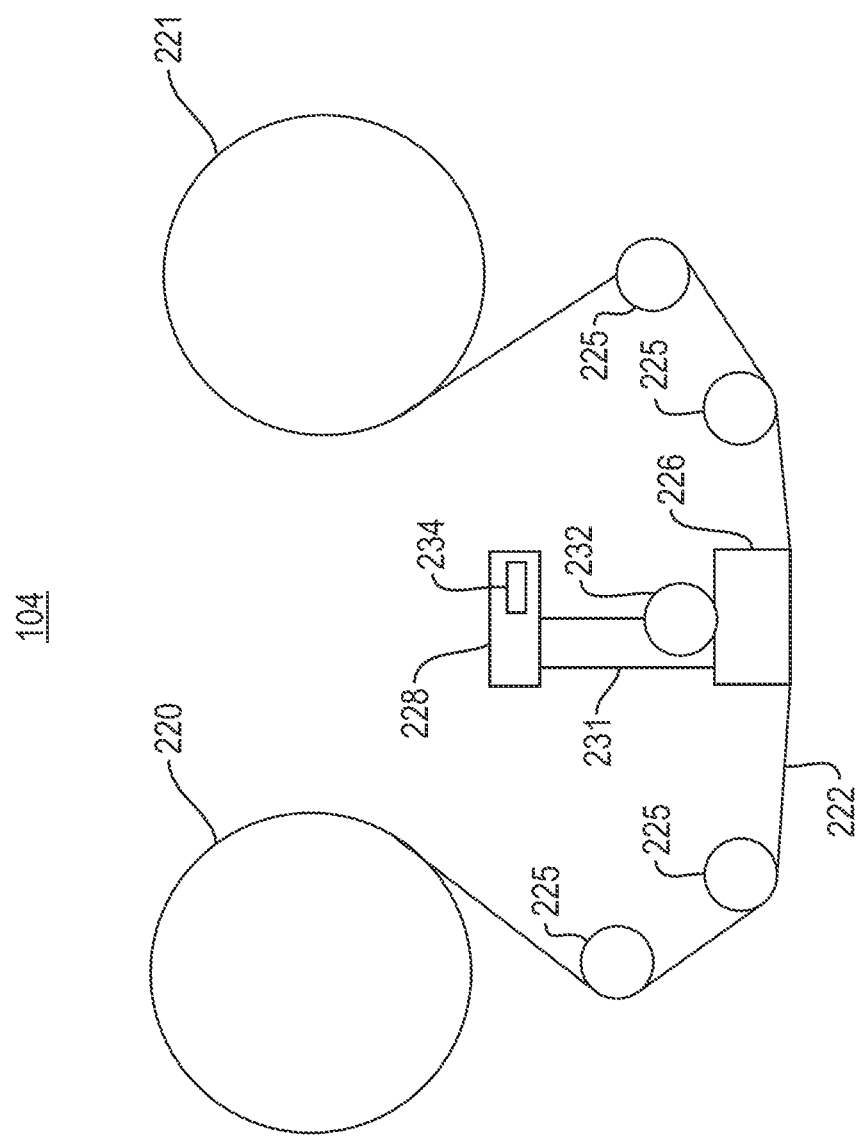

PERMANENT MAGNETIC CHUCKING DEVICE WITH LARGE FORCE DIFFERENTIAL

BACKGROUND

The present invention relates to data storage systems, and more particularly, this invention relates to apparatuses having magnetic properties for receiving at least partially ferromagnetic objects.

In magnetic storage systems, data are read from, and written onto, a magnetic recording medium utilizing magnetic transducers. Data are written on the magnetic recording medium by moving a magnetic recording transducer to a position over the medium where the data are to be stored. The magnetic recording transducer then generates a magnetic field, which encodes the data into the magnetic medium. Data are read from the medium by similarly positioning the magnetic read transducer and then sensing the magnetic field of the magnetic medium. Read and write operations may be independently synchronized with the movement of the medium to ensure that the data can be read from, and written to, the desired location on the medium.

In the near future, with the adoption of improved media, the cost of storing information (on a per byte basis) on tape is expected to decline by a factor of five or more with respect to magnetic disk. Also, short-term and long-term reliability will continue to favor tape-based storage. Furthermore, as more mass storage is allocated to cloud networks, most storage will be in large libraries, rather than on individual drives, which is a consideration favoring tape-based storage.

BRIEF SUMMARY

An apparatus according to one embodiment includes an arbor configured to receive an at least partially ferromagnetic object; and a magnet assembly. The magnet assembly includes multiple permanent magnets mounted in a soft ferromagnetic enclosure. The magnet assembly is rotatably coupled to the arbor such that the magnet assembly and the arbor are positionable relative to one another in locking and unlocking positions upon relative rotation therebetween. The magnet assembly is configured to exert a pulling force on the object in the locking position and a lesser force in the unlocking position.

An apparatus according to another embodiment includes an arbor configured to receive an at least partially ferromagnetic tape reel, and a magnet assembly having multiple permanent magnets mounted in a soft ferromagnetic enclosure. The magnet assembly is rotatably coupled to the arbor such that relative rotation therebetween causes the apparatus to move between locking and unlocking positions. The magnet assembly is configured to exert a magnetic pulling force on the tape reel in the locking position and a lesser force in the unlocking position.

An apparatus according to yet another embodiment includes an arbor and a magnet assembly rotatably coupled to the arbor. The magnet assembly includes multiple permanent magnets mounted in a soft ferromagnetic enclosure. The magnet assembly and the arbor are positionable relative to one another in locking and unlocking positions upon relative rotation therebetween.

A chucking mechanism, according to yet another embodiment, has two positions, the first position permitting locking a ferromagnetic reel to a rotatable arbor having precision reference surfaces, and the second position permitting releasing the ferromagnetic reel from the chucking mechanism. The chucking mechanism includes the arbor on which the reel is placed. The chucking mechanism also includes a permanent magnet assembly being movable relative to the arbor, the permanent magnet assembly exerting a pulling force on the reel in the first position and a relatively lesser force in the second position, the permanent magnet assembly including multiple permanent magnets enclosed in a soft ferromagnetic enclosure.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 2 is a schematic diagram of a simplified tape drive system according to one embodiment.

DETAILED DESCRIPTION

Figure 1A:
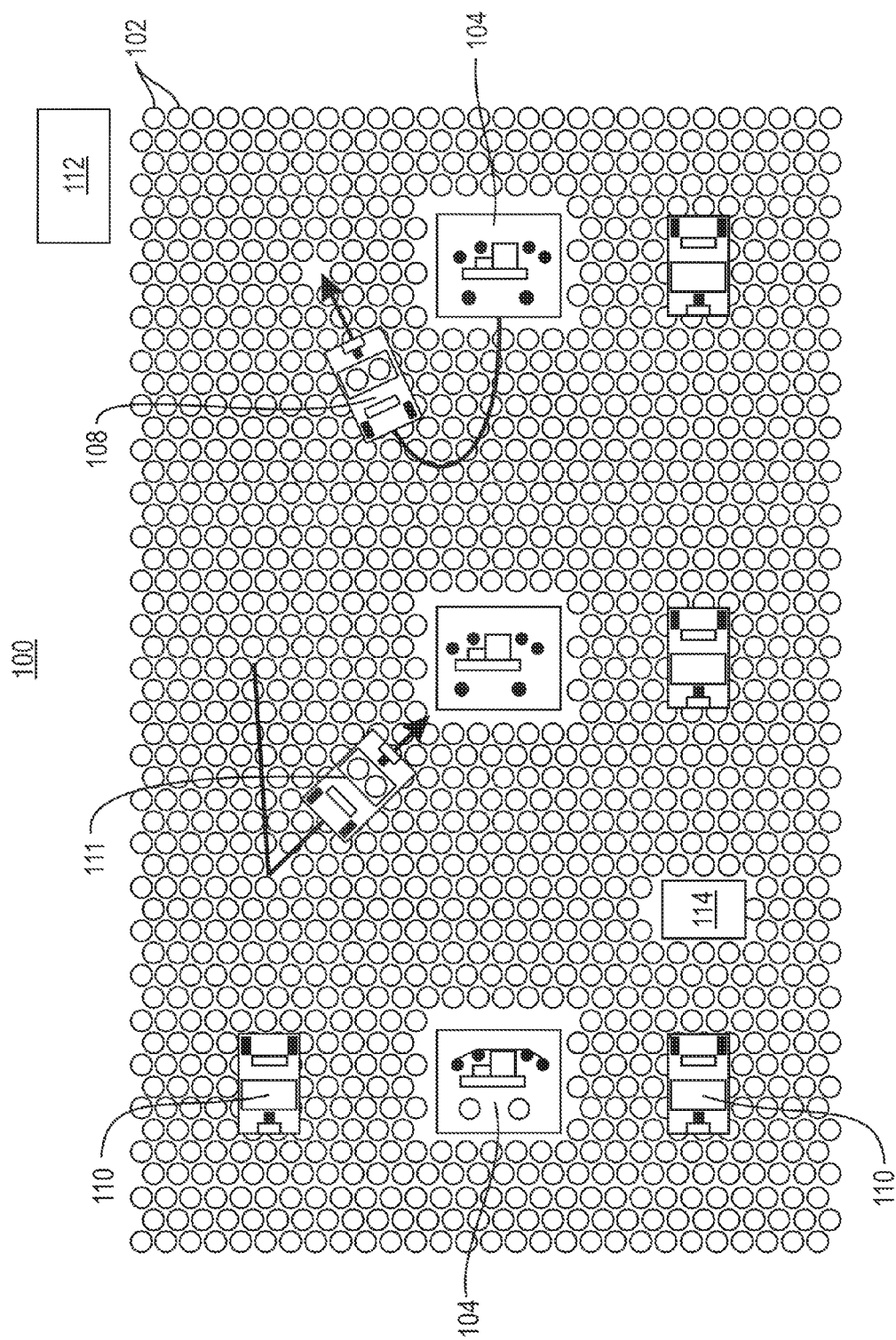
FIG. 1A is a top down view of a system using mobile robots for faster access to tape, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Furthermore, as used herein, the term "about" with reference to some stated value refers to the stated value ±10% of said value.

The following description discloses several preferred embodiments of magnetic storage systems having apparatuses with magnetic properties, as well as operation and/or component parts thereof. Various embodiments described herein include apparatuses having magnetic properties for temporarily coupling two mechanical objects together. It follows that the various embodiments are preferably able to provide precise placement and firm coupling of the mechanical objects, as will be described in further detail below.

In one general embodiment, an apparatus includes an arbor configured to receive an at least partially ferromagnetic object; and a magnet assembly. The magnet assembly includes multiple permanent magnets mounted in a soft ferromagnetic enclosure. The magnet assembly is rotatably coupled to the arbor such that the magnet assembly and the arbor are positionable relative to one another in locking and unlocking positions upon relative rotation therebetween. The magnet assembly is configured to exert a pulling force on the object in the locking position and a lesser force in the unlocking position.

In one general embodiment, an apparatus includes an arbor configured to receive an at least partially ferromagnetic tape reel, and a magnet assembly having multiple permanent magnets mounted in a soft ferromagnetic enclosure. The magnet assembly is rotatably coupled to the arbor such that relative rotation therebetween causes the apparatus to move between locking and unlocking positions. The magnet assembly is configured to exert a magnetic pulling force on the tape reel in the locking position and a lesser force in the unlocking position.

In yet another general embodiment, an apparatus includes an arbor and a magnet assembly rotatably coupled to the arbor. The magnet assembly includes multiple permanent magnets mounted in a soft ferromagnetic enclosure. The magnet assembly and the arbor are positionable relative to one another in locking and unlocking positions upon relative rotation therebetween.

In a further general embodiment, a chucking mechanism has two positions, the first position permitting locking a ferromagnetic reel to a rotatable arbor having precision reference surfaces, and the second position permitting releasing the ferromagnetic reel from the chucking mechanism. The chucking mechanism includes the arbor on which the reel is placed. The chucking mechanism also includes a permanent magnet assembly being movable relative to the arbor, the permanent magnet assembly exerting a pulling force on the reel in the first position and a relatively lesser force in the second position, the permanent magnet assembly including multiple permanent magnets enclosed in a soft ferromagnetic enclosure.

Tape drive data rates have increased, and currently are capable of exceeding 200 MB/s. However, sustained data rates of conventional products are limited due to their slow and bulky release mechanisms for coupling and decoupling tape reels. In sharp contrast, various embodiments described herein include magnet assemblies having designs that are compact, accurate, and have a large force differential between their locking and release positions. As a result, various embodiments herein are able to increase the achievable sustained data rates of systems, as will be described in further detail below.

FIG. 1A depicts a detailed view of a Linear Media Storage Module 100 in accordance with one embodiment. As an option, the present Linear Media Storage Module 100 may be implemented in conjunction with features from any other embodiment listed herein, such as those described with reference to the other FIGS. However, such Linear Media Storage Module 100 and others presented herein may be used in various applications and/or in permutations which may or may not be specifically described in the illustrative embodiments listed herein. Moreover, the Linear Media Storage Module 100 presented herein may be used in any desired environment. Further still, the Linear Media Storage Module 100 is in no way limited to that which is illustrated in FIG. 1A and may include any parts and/or orientation of parts which would be desirable depending on various embodiments.

As shown by the partial top down view of FIG. 1A, a Linear Media Storage Module 100, such as a tape library, may include one or more mobile robots 110 for transporting at least one tape reel 102, which may or may not be part of a tape cartridge, to and from tape drives 104 for reading data from the tape. Also, mobile robot 108 has retrieved tape reels from a tape drive which has completed a reading operation, and is returning the tape reels to their storage location.

The linear media (i.e., tape) may preferably be wound on tape reels 102, also referred to herein as spools. The system may include at least one winding station 114 for performing coarse locate operations (prelocating) on the reels to position the tape near the data position for a subsequent read/write operation, prior to the reels being mounted to the at least one tape drive 104.

The Linear Media Storage Module 100 may also comprise a controller 112 for directing movement of the mobile robot 110. The controller 112 may be on board the mobile robot 110, or away from the robot 110 (as shown in FIG. 1) and in communication therewith via any type of communication channel (such as wireless, wired, infrared, etc.).

According to an exemplary embodiment, at least some of the tape reels 102, preferably having tape wound thereon, may further include a spring-like clip coupled to a free end of the tape, where the free end is defined as the end of the tape that is unwound from the reel 102 first.

Looking to FIG. B, a perspective view of a tape reel 102 having a spring-like clip 106 is illustrated according to an exemplary embodiment, which is in no way intended to limit the invention.

Depending on the embodiment, the reel 102 may be a device, such as a cylinder, spool, frame, etc. that is rotatable about an axis, e.g., when mounted on a chuck (also referred to herein as an arbor), and is used for winding and storing tape, film, or other flexible materials, as will soon become apparent. Moreover, according to other approaches, the reel 102 may include any of the embodiments described herein with reference to reel(s) of various FIGS.

Figure 1B:
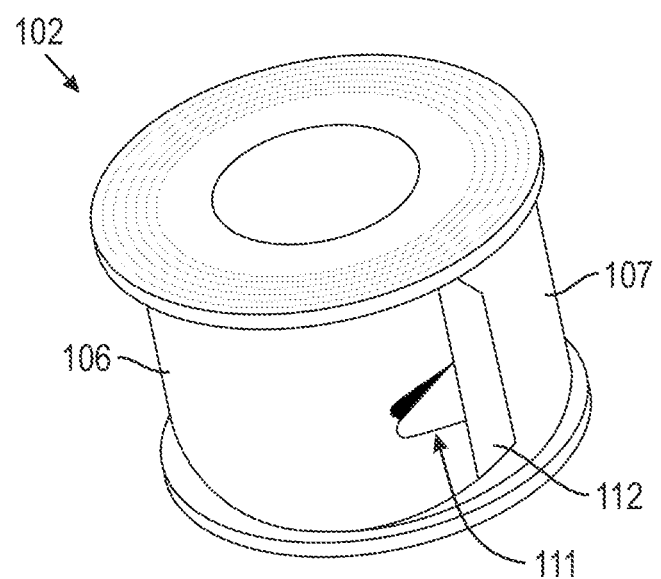
FIG. 1B is a perspective view of a tape reel, according to one embodiment.

With continued reference to FIG. 1B, the reel 102 also includes a tape 107 coupled to the reel 102. The tape 107 may be a conventional tape of any type, preferably a magnetic recording tape, but is not limited thereto. Moreover, according to various approaches, the tape 107 may be coupled to the reel 102 using any conventional method, e.g., a bonding agent, fastener, a groove, etc.

Additionally the reel 102 includes a spring-like clip 106, having an engagement feature 111 and bent portion 112, coupled to a free end of the tape 107. With reference to the present description, the "free end" of the tape 107 is defined as the end of the tape 107 that is unwound from the reel 102 first. In other words, the free end of the tape 107 is the end of the tape 107 which is opposite the end coupled to the reel 102, as described above. Thus, one end of the tape 107 is preferably coupled to the reel 102, while the other end of the tape 107 (the free end) is coupled to the spring-like clip 106.

Moreover, it should also be noted that "spring-like" is intended to mean that at least a portion of the clip 106 is resiliently deformable. Thus, under zero external tension, the clip preferably returns to its at-rest shape, e.g., a rounded shape.

The spring-like clip may allow for reduced loading and unloading times for tape storage media to and from a supply reel. Exemplary systems having a spring-like clip coupled to a free end of a tape, and which may be used in conjunction with various embodiments herein, are presented in copending U.S. patent application Ser. No. 14/108,279 by David Erpelding et al., and titled SPRING CLIP LEADER AND HOUSING FOR MAGNETIC TAPE, which is herein incorporated by reference.

Referring again now to FIG. 1A, the tape reels 102 may lie on a lower surface, such as a "floor," of a rest area for storing the reels when the reels are not in use. According to different approaches, the rest area may have one level, more than one level, etc., and may further include, but is not limited to, ramps to preferably provide for the movement of linear media between the levels. The rest area is preferably a horizontal surface on which the tape reels rest; however in other approaches, the rest area may incorporate a vertical, angled, terraced, stacked, etc. surface, or combinations thereof. In such alternate approaches, the tape reels may be attached to and/or supported by the rest area by using hooks, lips, magnets, shelves, sleeves, posts, etc. or some other design to counteract the force of gravity on the tape reels if desired.

The tape on the selected tape reel or pair of tape reels may be accessed by the mobile robots 110, which may be miniature remote-controlled vehicles that move via contact with a surface. Thus, the tape reels may lie on a lower surface, such as a "floor," while a mobile robot maneuvers on the upper surface via contact with the surface, such as by utilizing drive wheels and magnetic attraction between the robot and the upper surface or portions of the upper surface. In one approach, the tape library may comprise more than one level. On each level, tape reels may be arranged on a lower surface (used interchangeably with the term "floor") in a dense pattern. This arrangement is shown in partial top down view of FIG. 1A, according to one embodiment.

To keep track of where data are stored, particularly in relation to corresponding data, some sort of mapping scheme is desirable. Such a mapping scheme may preferably be capable of identifying the physical location of the current version of each logical block, of which the information is also referred to herein as meta-data. According to different approaches, the mapping scheme may store the physical locations of data in terms of the magnetic indexes recorded during tape manufacture and/or the length along the tape where the data were written, e.g., which may be determined by the number of reel revolutions, longitudinal position (LPOS) information, etc. According to one approach, the mapping scheme may use mapping tables. The mapping tables keep track of where the data and/or meta-data are stored, preferably such that any data may be located and accessed after they are written. Thus, mapping tables may preferably be accessed and/or updated with each write and/or read request. However, the mapping tables may be accessed and/or updated after each write request has been completed, before each read request is processed, at timed intervals, upon request (e.g., from a user), etc. depending on the desired embodiment. Mapping tables may be stored on the tape itself, a tape cartridge, a database such as a tape library database, etc.

A contiguous tape may be stored on a single reel, and may include a pin or other end piece that enables threading of the tape in the tape drive. In other approaches, the tape may be coupled to a pair of reels, e.g., in a tape cartridge. According to one embodiment, magnetic tape may be included in miniature tape reels 102 which have only a fraction of the tape length of a standard tape cartridge, thereby decreasing seek time. Such shorter length may be, e.g., less than about ⅕th the tape length of a standard Linear Tape Open (LTO) tape cartridge, or less than about ¹⁄₂₅$^{th}$ the tape length of a standard tape cartridge, or less than about ¹⁄₅₀th the tape length of a standard tape cartridge, etc. In some approaches, a length of tape on the plurality of tape reels 102 may be less than about 50 meters for each tape reel 102. However, in other approaches, a length of tape on the plurality of tape reels 102 may be less than about 25 meters, or 20 meters or less, etc. for each tape reel 102, depending on the desired embodiment.

In some approaches, a single tape drive 104 is available for reading and/or writing tape on the tape reels 102. Depending on the frequency with which files are read, a plurality of tape drives 104 may be available for reading and/or writing tape on the tape reels 102, as shown in FIG. 1A by the leftmost tape drive 104 reading a tape. The tape drives 104 may be located on a lower surface, such as a "floor," of a rest area in any arrangement as desired by one of skill in the art upon reading the present description, preferably such that quick access to the tape drives 104 is possible to reduce loading and data access times.

FIG. 2 illustrates a simplified view of the tape drive 104 of a tape-based data storage system, which may be employed in the context of the present invention. While one specific implementation of a tape drive is shown in FIG. 2, it should be noted that the embodiments described herein may be implemented in the context of a variety of tape drive systems. Additional tape drive embodiments are presented in copending U.S. patent application Ser. No. 14/108,279.

With continued reference to FIG. 2, a tape supply reel 220 and a take-up reel 221 are provided to support a tape 222. One or more of the reels may form part of a removable cartridge and are not necessarily part of the tape drive 104. The tape drive, such as that illustrated in FIG. 2, may further include drive motor(s) to drive the tape supply reel 220 and the take-up reel 221 to move the tape 222 over a tape head 226 of any type. Such head may include an array of readers, writers, or both.

Although a tape drive 104 may be capable of both reading and writing linear media, it may be preferable for a given drive or drives to perform only one of these operations (i.e., reading or writing) for an extended period of time. Additionally, there may be a cost advantage in having separate linear media drives due to the reduced amount of electronics, heads, etc. Moreover, since the sequential write method provides higher effective random write performance, system cost may be reduced by combining a number of write drives with a larger number of read-only drives. Thus, it may be preferable for at least a subset, a majority, all, etc. of the drives in a linear storage media tier to be optimized for writing or reading exclusively.

Guides 225 guide the tape 222 across the tape head 226. Such tape head 226 is in turn coupled to a controller assembly 228 via a cable 231. The controller 228 typically controls head functions such as servo following, writing, reading, etc. The controller may operate under logic known in the art, as well as any logic disclosed herein. The cable 231 may include read/write circuits to transmit data to the head 226 to be recorded on the tape 222 and to receive data read by the head 226 from the tape 222. An actuator 232 controls the position of the head 226 relative to the tape 222.

An interface 234 may also be provided for communication between the tape drive and a host (integral or external) to send and receive the data and for controlling the operation of the tape drive and communicating the status of the tape drive to the host, all as will be understood by those of skill in the art.

Figure 3A:
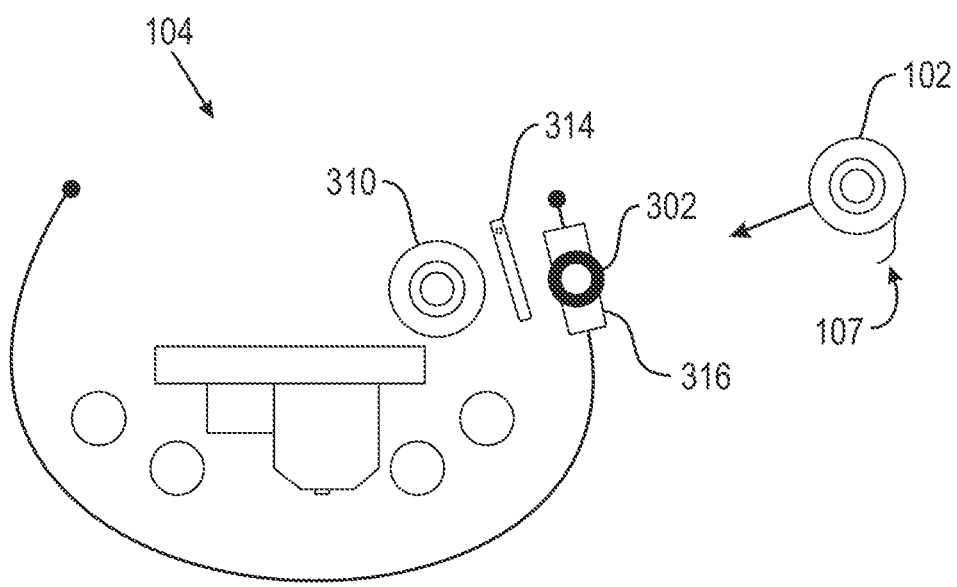
FIGS. 3A-3C are schematic representations of tape threading using a mobile robot, according to one embodiment.
Figure 3B:
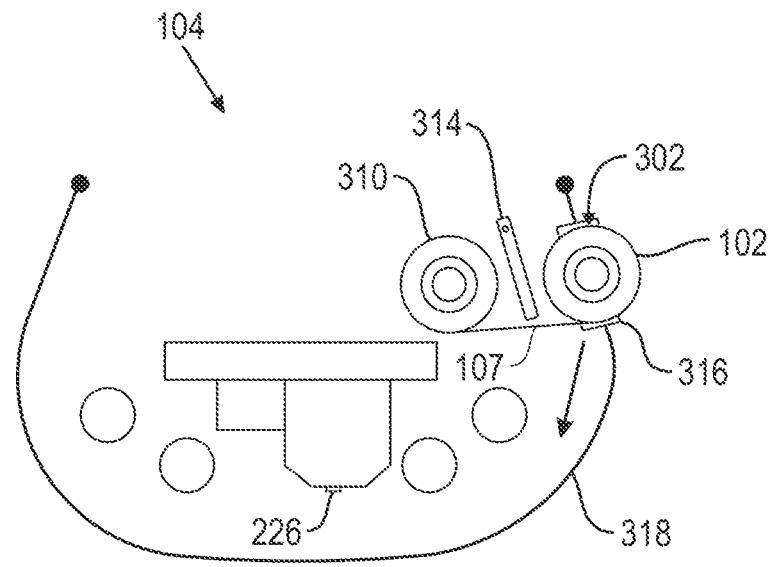
Figure 3C:
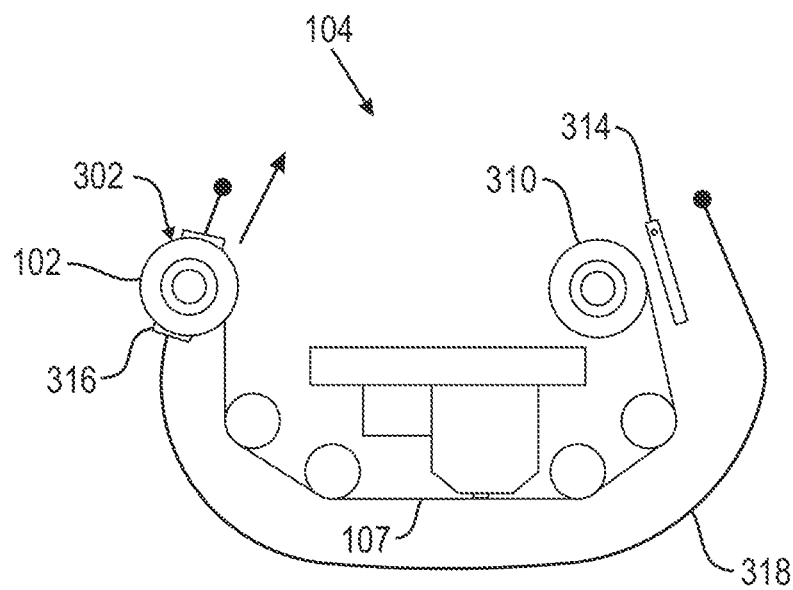

FIGS. 3A-3C illustrate a tape drive 104, according to one embodiment. As an option, the present systems may be implemented in conjunction with features from any other embodiment listed herein, such as those described with reference to the other FIGS. However, such systems and others presented herein may be used in various applications and/or in permutations which may or may not be specifically described in the illustrative embodiments listed herein. Further, the systems presented herein may be used in any desired environment. Thus FIGS. 3A-3C (and the other FIGS.) should be deemed to include any and all possible permutations.

Looking now to FIGS. 3A-3C, a single reel 102 of tape 107 may be loaded onto a reel arbor 302 and motor, e.g., for rotating the reel 107, which are fixed to a carriage 316 that is adapted to follow a guide 318 that allows for motion of the arbor 302 around the tape drive 104 to facilitate threading of the tape 107. Before loading the reel 102 on the arbor 302, the arbor 302 is brought into proximity of the inboard (take-up) reel 310, as shown in FIG. 3A. After the mobile robot (not shown for clarity) places the reel 102 on the arbor 302, a mechanism 314 attaches the end of the tape 107 to the take-up reel 310. See FIG. 3B.

Referring still to FIG. 3B, according to one approach which is in no way intended to limit the invention, the mechanism 314 may transfer an end of the tape on the tape reel 102 onto the take-up reel 310. Upon loading the end of the tape onto the take-up reel 310, an optional winding process may be initiated, e.g., to perform a preliminary locate operation.

Looking now to FIG. 3C, the arbor 302, reel motor and tape reel 102 are moved along the guide 318 to a final position, where the tape 107 may be read from and/or written to by a tape head 226.

As briefly described above in the embodiment of FIGS. 3A-3C, an arbor may be used for receiving a tape reel. If tape reels are changed quickly and accurately on a frequent basis, e.g., as in a Linear Media Storage Module 100, the arbor is desirably able to provide precise placement and firm coupling of the two objects.

According to an example, which is in no way intended to limit the invention, in magnetic tape recording systems a supply reel of magnetic tape may be coupled with the rotating shaft of a motor, e.g., to enable winding of the tape from the supply reel to a take-up reel, and back from the take-up reel to the supply reel. Therefore, the mechanical coupling between the supply reel and motor is preferably able to prevent slippage and accurately control the tape transport between reel motors. However, if the desired operation calls for frequent changing of supply reels, this mechanical coupling cannot be permanent. For example, after a data transfer operation is complete, a supply reel is removed and a different reel of magnetic tape needs to be loaded into the magnetic tape recording system.

According to various embodiments, permanent magnets may be used to attract a tape reel into a controlled contact with an arbor, e.g., having minimal motion during actuation of the arbor. Moreover, a mechanism may be manually and/or automatically used to reduce a magnetic coupling between the tape reel and the arbor to release the supply reel, as will be described in further detail below.

Figure 4A:
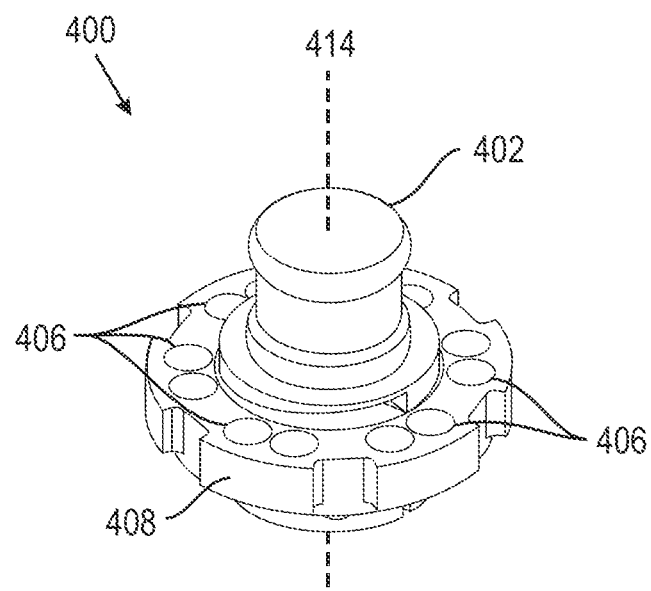
FIG. 4A is a partial perspective view of an apparatus for receiving an object, according to one embodiment.
Figure 4B:
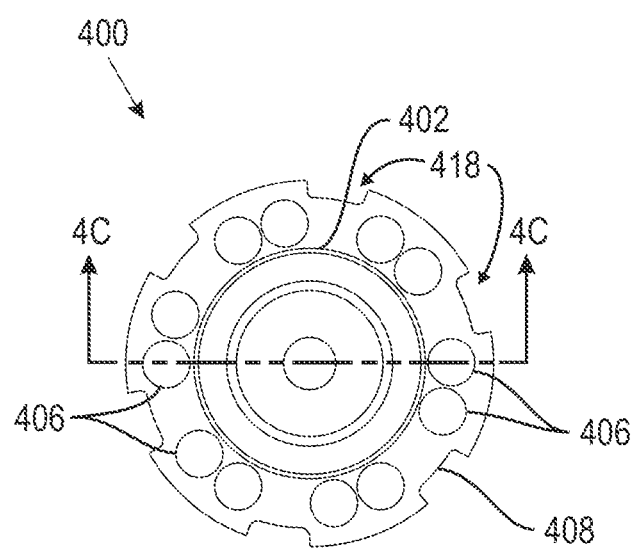
FIG. 4B is a top view of the apparatus in FIG. 4A.
Figure 4C:
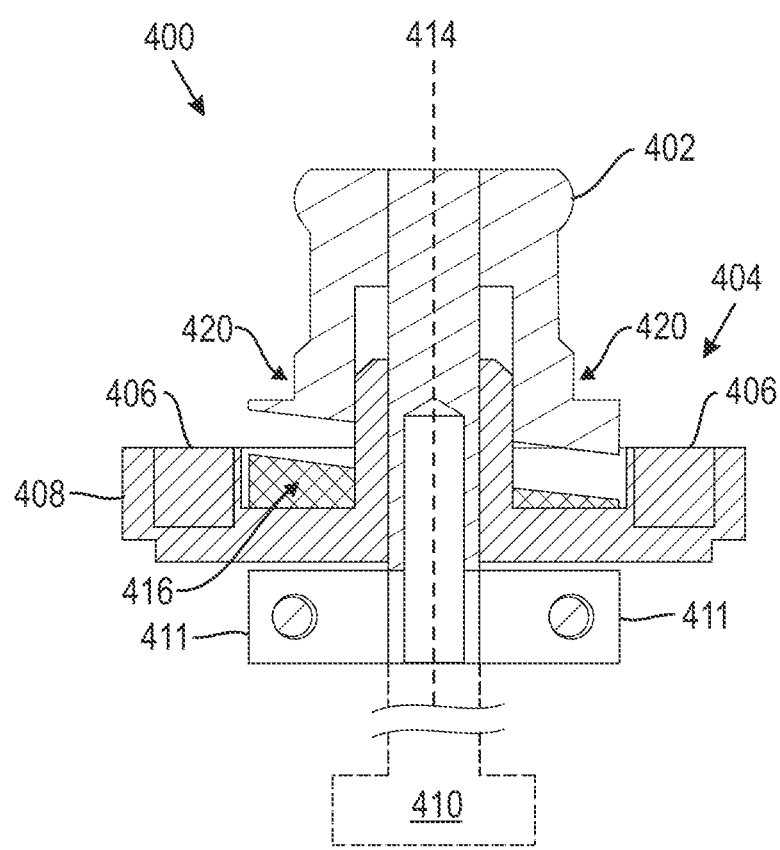
FIG. 4C is a partial cross-sectional view of the apparatus taken along line 4C-4C of FIG. 4B.

FIGS. 4A-4C depict different views of an apparatus 400, in accordance with one embodiment. As an option, the present apparatus 400 may be implemented in conjunction with features from any other embodiment listed herein, such as those described with reference to the other FIGS. Such apparatus 400 and others presented herein may be used in various applications and/or in permutations which may or may not be specifically described in the illustrative embodiments listed herein. Further, the apparatus 400 presented herein may be used in any desired environment.

Referring now to FIGS. 4A-4C, the apparatus 400 includes an arbor 402. The arbor 402 is preferably configured to receive an at least partially ferromagnetic object, such as a tape reel according to any of the embodiments described herein. Thus according to the embodiment illustrated in FIGS. 4A-4C, the arbor 402 is contoured to precisely guide and self-center the object onto the arbor 402. In the embodiment shown, the arbor 402 has a rounded upper lip, e.g., for receiving an at least partially ferromagnetic tape reel, as described in further detail below with reference to FIGS. 5A-5B.

The rounded upper lip of the arbor 402 as seen in FIGS. 4A-4C may prevent binding when mounting a tape reel thereon. Close fitting parts tend to bind when skewed to even a small angle off parallel. The use of a rounded tip helps to account for imperfect mounting angles. Accordingly, the radius of the rounded upper lip is preferably smaller than an inner radius of the object being coupled with the arbor 402. This creates point contact at an angle, which in turn reduces friction and prevents binding between the arbor 402 and tape reel.

Figure 5A:
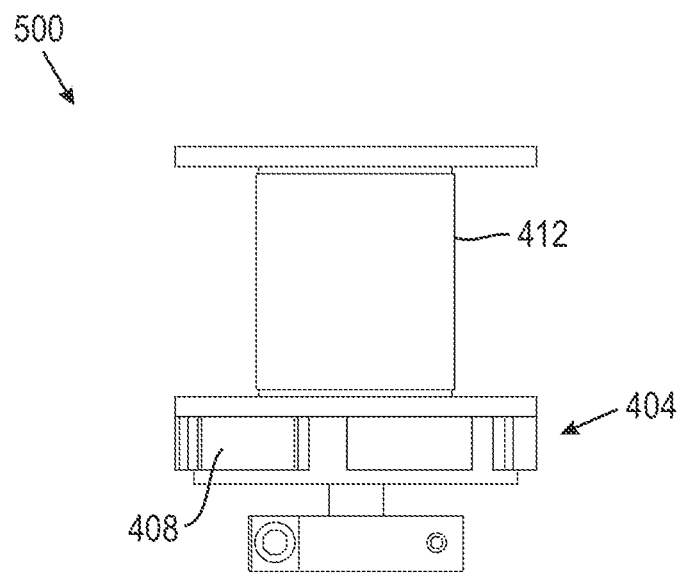
FIG. 5A is a partial side view of an apparatus in a locking position, according to one embodiment.
Figure 5B:
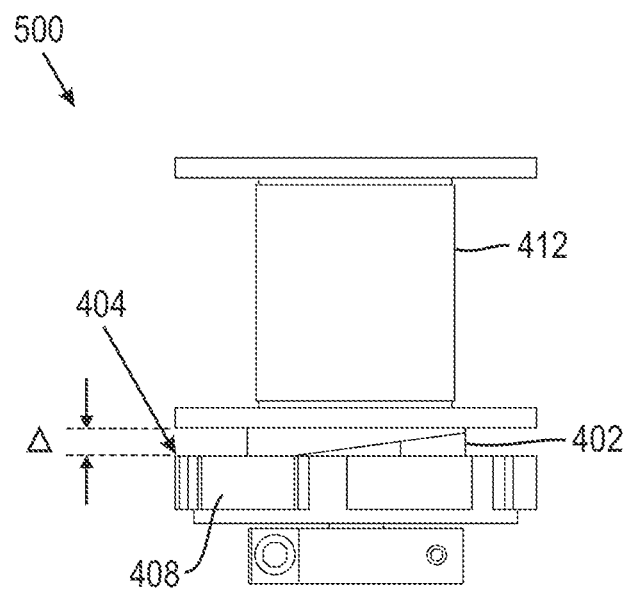
FIG. 5B is a partial side view of an apparatus in an unlocking position, according to one embodiment.

Furthermore, the addition of a chamfered section 420 to the bottom of the arbor 402 improves alignment of the tape reel with the sides of the arbor 402 when fully seated onto the arbor as seen in FIGS. 5A-5B. The arbor 402 may also have precision reference surfaces, e.g., locating datums, to further facilitate locking the tape reel 412 to the arbor 402.

Apparatus 400 of FIGS. 4A-4C further includes a magnet assembly 404 including multiple permanent magnets 406 mounted in a soft ferromagnetic enclosure 408. It should be noted that although twelve permanent magnets 406 are illustrated in FIG. 4B, more or fewer permanent magnets may be present in the soft ferromagnetic enclosure 408. According to various approaches, an apparatus may include at least two, at least three, at least four, etc. permanent magnets mounted in the soft ferromagnetic enclosure 408, depending on the desired embodiment.

Illustrative materials for the permanent magnets 406 may include NdFeB, Samarium-cobalt, etc., or any other hard magnetic material that would be apparent to one skilled in the art upon reading the present description. In preferred embodiments, the permanent magnets 406 include a material or materials that have a high moment and/or are resistant to demagnetization.

Moreover, according to various embodiments the soft ferromagnetic enclosure 408 may include steel, NiFe, CoFe, etc., or any other soft magnetic material that would be apparent to one skilled in the art upon reading the present description. In preferred approaches, the soft ferromagnetic enclosure 408 includes a material that has a high moment.

The multiple permanent magnets 406 may be mounted in different positions in the soft ferromagnetic enclosure 408. For example, in some approaches, the top surface of the soft ferromagnetic enclosure 408 may be recessed from the top surfaces of the permanent magnets 406. Furthermore, the top surfaces of the permanent magnets 406 may be recessed from the top surface of the soft ferromagnetic enclosure 408. In some approaches, the apparatus 400 may not include a soft ferromagnetic enclosure 408 at all.

However, through experimentally supported modeling (e.g., see FIG. 6), the inventors found that the most desirable characteristics of the permanent magnets 406 are achieved by positioning them such that the top surfaces of the permanent magnets 406 are flush with a top surface of the soft ferromagnetic enclosure 408. See FIG. 4C. As will soon become apparent, by positioning the permanent magnets 406 such that the top surfaces thereof are flush with a top surface of the soft ferromagnetic enclosure 408, apparatus 400 achieved a desirable force v. distance correlation between the permanent magnets and the at least partially ferromagnetic object (in this example, a tape reel 412).

According to various embodiments, the at least partially ferromagnetic object may include a magnetically soft material, a material having a magnetically soft base, etc. Illustrative materials may include steel, NiFe, CoFe, etc., or any other at least partially ferromagnetic material that would be apparent to one skilled in the art upon reading the present description.

Each of the permanent magnets 406 is preferably anisotropic, thereby having a specific magnetization direction. According to different approaches, the magnetization direction for each of the permanent magnets 406 may be oriented in any given direction. For example, each of the permanent magnets 406 may have a magnetization direction that is different than the other permanent magnets 406.

However, in preferred approaches, the magnetizations of all of the permanent magnets 406 are oriented parallel to an axis 414 of the arbor 402, e.g., the central axis, rotational axis, etc. Moreover, it is further preferred that the magnetizations of all of the permanent magnets 406 are oriented in the same direction along the axis 414 of the arbor 402, as will soon become apparent.

With continued reference to FIGS. 4A-4C, the magnet assembly 404 is rotatably coupled to the arbor 402. In other words, a relative rotational movement may be induced between the magnet assembly 404 and the arbor 402 upon applying a force, e.g., using a motor 410 that may be coupled to the arbor 402 using clamps 411.

According to the present embodiment, the arbor 402 is illustrated as being coupled to a motor 410 that may be used to induce a relative rotational movement between the magnet assembly 404 and the arbor 402. In some approaches, the relative rotational movement may be caused by the arbor 402 rotating while the magnet assembly 404 remains stationary. In other approaches, the arbor 402 may be fixed, while the magnet assembly 404 is rotationally unconstrained. However, in still further approaches, both the arbor 402 and magnet assembly 404 may be able to rotate independently of each other.

For embodiments in which the magnet assembly 404 is fixed, while the arbor 402 is rotationally unconstrained, apparatus 400 may further include a mechanism to selectively prevent rotation of the magnet assembly 404 while the arbor 402 rotates, thereby creating relative rotation between the arbor 402 and the magnet assembly 404, e.g., between predetermined positions. According to one approach, the mechanism may be a pin that engages one or more of the grooves 418 in the ferromagnetic material 408 of the magnet assembly 404. However, in other approaches the mechanism may include a locking arm, a retractable member, a locking gear, etc., or any other means of locking the magnet assembly 404 which would be apparent to one skilled in the art upon reading the present description.

Moreover, for other embodiments in which the arbor 402 is fixed, while the magnet assembly 404 is rotationally unconstrained, apparatus 400 may include a mechanism to selectively prevent rotation of the arbor 402 when the magnet assembly 404 rotates, thereby creating relative rotation between the arbor 402 and the magnet assembly 404, e.g., between predetermined positions. As mentioned above, the mechanism may include any means of locking the arbor 402 which would be apparent to one skilled in the art upon reading the present description. Furthermore, as previously mentioned, in other approaches, the arbor 402 may have precision reference surfaces, e.g., locating datums, to facilitate locking the tape reel 412 to the arbor 402.

Accordingly, the magnet assembly 404 and the arbor 402 may be reversibly positionable relative to one another in locking and unlocking positions upon relative rotation therebetween.

Looking momentarily to FIGS. 5A-5B, the locking and unlocking positions of an apparatus 500 are illustrated, respectively. The locking position as depicted in FIG. 5A has the tape reel 412 and the magnet assembly 404 being about in contact with each other, which desirably permits locking the object (here a tape reel 412) to the arbor 402 by exerting a magnetic pulling force on the object. It follows that when in close proximity, the permanent magnets 406 preferably exert a strong enough magnetic pulling force on the tape reel 412 to facilitate mechanical coupling therebetween, e.g., to prevent slippage and accurately control tape transport between reels (e.g., see FIG. 2) at rotational speeds up to, and preferably exceeding, 5000 revolutions per minute. Moreover, the permanent magnets 406 preferably exert a strong enough magnetic pulling force on the tape reel 412 in the locking position to counteract any tangential forces transferred to the apparatus when winding and/or unwinding tape from the tape reel 412.

Alternatively, the unlocking position as illustrated in FIG. 5B permits releasing the tape reel 412 from the arbor 402 by reducing the magnetic pulling force experienced by the tape reel 412 to a lesser, preferably negligible, force. When in the unlocking position, the separation distance $\Delta$ between the tape reel 412 and the permanent magnets 406 is greater than when in the locking position. As the separation distance $\Delta$ increases, the magnetic pulling force experienced by the tape reel 412 reduces greatly, preferably amounting to an essentially negligible force, and allows for the tape reel 412 to be released from the arbor 402. It should be noted that this decay of magnetic pulling force as the separation distance $\Delta$ increases is also referred to herein as the half force distance.

Therefore, the permanent magnets 406 of the magnet assembly 404 exert a high magnetic pulling force on the object when in a locking position, while the object experiences a lesser, and preferably only a negligible, pulling force when in an unlocking position. This may be achieved using permanent magnets 406 that are characterized as having a magnetic field that decays rapidly with the distance to the surface of the permanent magnets 406 of the magnet assembly 404.

Figure 6:
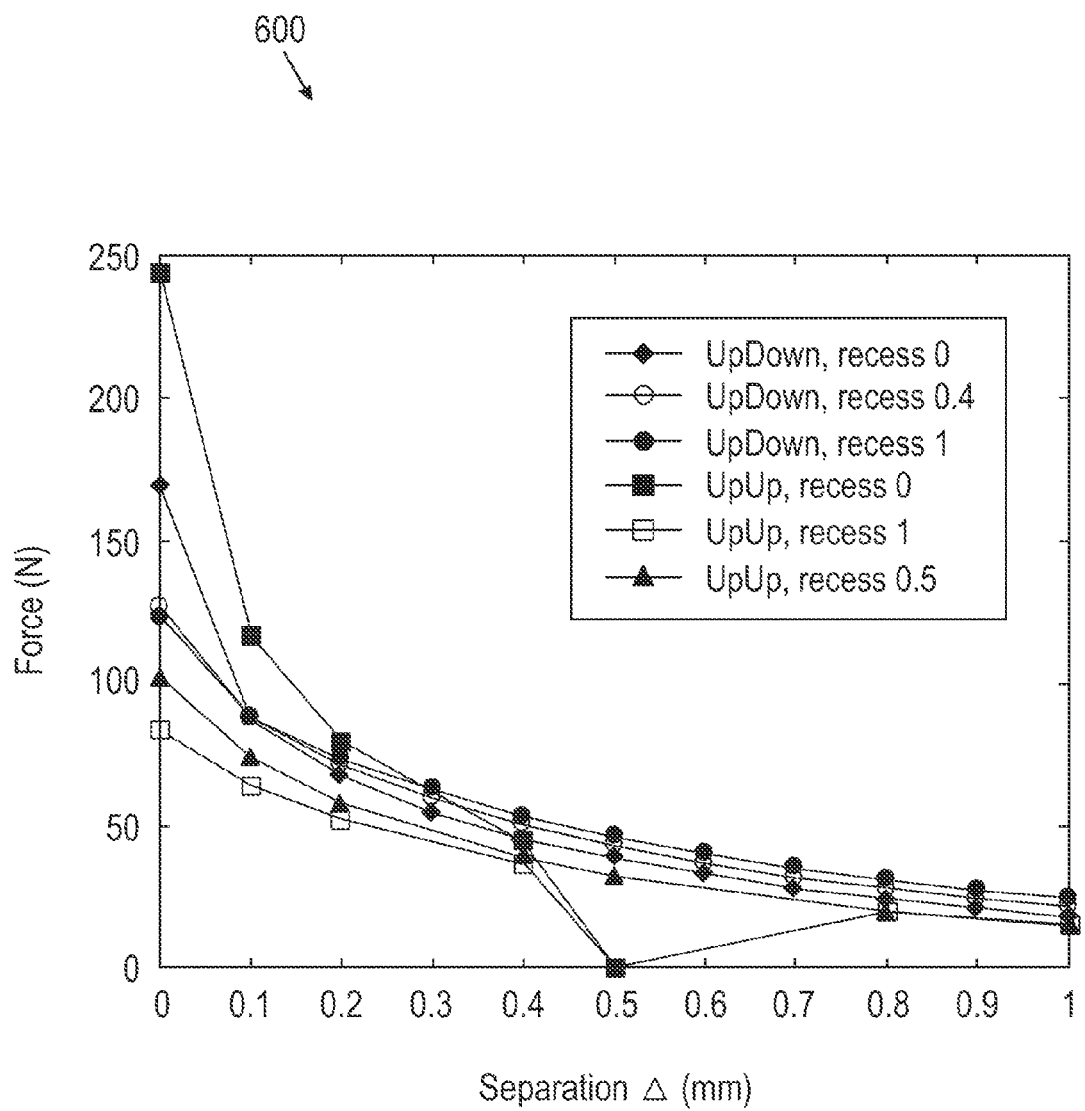
FIG. 6 is a graph plotting the force v. distance correlation according to several embodiments.

The inventors were able to determine a preferred positioning and magnetization direction for the permanent magnets 406 using experimentally supported modeling in addition to finite element modeling of the material magnetization and forces, the results of which are presented in the graph 600 of FIG. 6. Moreover, it should be noted that the graph 600 of FIG. 6 is presented by way of example only, and is in no way intended to limit the invention.

Looking now to FIG. 6, graph 600 depicts the magnetic force v. separation distance correlation between the permanent magnets and the at least partially ferromagnetic object according to different embodiments. Accordingly, the force exerted by the permanent magnets on the ferromagnetic object has been calculated as a function of the distance therebetween (e.g., see Δ of FIG. 5B) for different dimensions of the ferromagnetic material, polarity of the magnets, spacing between the magnets, etc.

The plots labeled "UpDown" represent embodiments in which the magnetic orientation of permanent magnets were oriented in opposite directions from each other, e.g., antiparallel along axis 414, so that the orientation of the permanent magnets alternated with the angular position of the magnet around the axes. Alternatively, the plots labeled "UpUp" represent embodiments in which the magnetic orientation of the permanent magnets were oriented in the same direction (e.g., parallel along axis 414). Furthermore, the phrase "recess #" denotes the distance, in millimeters, that the top surface of the soft ferromagnetic enclosure (e.g., see 408 of FIGS. 4A-4C) was recessed from the top surfaces of the permanent magnets (e.g., see 406 of FIGS. 4A-4C). For example, the plot labeled "UpDown, recess 0.5" represents an embodiment in which the magnetic orientation of the permanent magnets were opposite (i.e., antiparallel) and the ferromagnetic enclosure was recessed from the top surfaces of the permanent magnets by a distance of 0.5 mm. In another example, the plot labeled "UpUp, recess 0" represents an embodiment in which the magnetic orientation of the permanent magnets were in the same direction (i.e., parallel) and the ferromagnetic enclosure was flush with the top surfaces of the permanent magnets (i.e., a recess of 0 mm).

Examining the data presented in the graph 600 of FIG. 6, the plot labeled "UpUp, recess 0" exhibits the strongest magnetic force at a separation distance of 0 mm. Furthermore, following the same plot labeled "UpUp, recess 0", as the separation increases the relative magnetic force reduces to a minimum compared to the other embodiments modeled. As described above, it is desirable for the magnet assembly to exert a high magnetic pulling force on the object when in a locking position (separation distance of 0 mm), while also having the object experience an essentially negligible pulling force when in an unlocking position (separation distance >0 mm).

Therefore, referring back to FIGS. 4A-4C, the permanent magnets 406 are preferably positioned such that the top surfaces of the permanent magnets 406 are flush with a top surface of the soft ferromagnetic enclosure 408. Furthermore, the magnetizations of all of the permanent magnets 406 are preferably oriented in a same direction along axis 414.

Furthermore, to maximize the force differential between the locking and unlocking positions, in addition to minimizing the half force distance, it is preferred that, for a given total surface area of the magnets, the number of permanent magnets is increased. In other words, the surface of area of each of the permanent magnets is preferably reduced, thereby allowing for a greater number of permanent magnets to achieve the desired total surface area mentioned above. This is because the force of the magnet assembly 404 at the locking position is proportional to the total surface area of the permanent magnets 406 of the magnet assembly 404. For example, two permanent magnets having a diameter of 4 mm will provide about the same force as eight permanent magnets having a 2 mm diameter. However, the latter will have a steeper drop of the force v. distance plot as exhibited in graph 600 of FIG. 6.

As previously introduced, FIGS. 5A-5B depict an apparatus 500, in accordance with one embodiment. As an option, the present apparatus 500 may be implemented in conjunction with features from any other embodiment listed herein, such as those described with reference to the other FIGS., such as FIGS. 4A-4C. Specifically, FIGS. 5A-5B illustrate a variation of the embodiment of FIGS. 4A-4C depicting the locking and unlocking positions of the apparatus 500. Accordingly, various components of FIGS. 5A-5B have common numbering with those of FIGS. 4A-4C.

However, such apparatus 500 and others presented herein may be used in various applications and/or in permutations which may or may not be specifically described in the illustrative embodiments listed herein. Further, the apparatus 500 presented herein may be used in any desired environment. Thus FIGS. 5A-5B (and the other FIGS.) should be deemed to include any and all possible permutations.

The locking position as depicted in FIG. 5A includes the tape reel 412 and the magnet assembly 404 being about in contact with each other, which desirably permits locking the object (here a tape reel 412) to the arbor 402 by exerting a magnetic pulling force on the object. It follows that when in close proximity, the permanent magnets 406 preferably exert a strong enough magnetic pulling force on the tape reel 412 to facilitate mechanical coupling therebetween, e.g., to prevent slippage and accurately control tape transport between reels (e.g., see FIG. 2).

The arbor may be configured to cause the tape reel 412 to contact the permanent magnets when mounted on the arbor and in a locking position. For example, a lower surface of the tape reel may be in direct contact with the permanent magnets 406 and the soft ferromagnetic enclosure 408. Thus, when in the locking position, the magnetic flux from the permanent magnets 406 transfers directly to the tape reel 412. Moreover, there are no intermediate soft magnetic members, thereby allowing for a compact and simplified apparatus 500.

However, in other approaches, a layer may be formed above the permanent magnets 406 and/or the soft ferromagnetic enclosure 408. Depending on the desired embodiment, the additional layer may protect the permanent magnets 406 and/or the soft ferromagnetic enclosure 408, e.g., from damage that may otherwise be caused by direct contact with the tape reel 412 in a locking position, from corrosion, etc. Accordingly, the additional layer may include any material that does not compromise the magnetic properties of the magnet assembly 404.

Alternatively, the unlocking position, as illustrated in FIG. 5B, permits releasing the tape reel 412 from the arbor 402 by reducing the magnetic pulling force of the permanent magnets 406 to a lesser (e.g., negligible) force. When in the unlocking position, the separation distance Δ between the arbor 402 and the permanent magnets 406 is greater than when in the locking position. It follows that, when in the unlocking position, the separation distance Δ between the tape reel 412 and the permanent magnets 406 is greater than when in the locking position, as the tape reel 412 is coupled to the arbor 402. As the separation distance Δ increases, the magnetic pulling force experienced by the tape reel 412 reduces greatly, preferably amounting to an essentially negligible force, thereby allowing for the tape reel 412 to be released from the arbor 402.

The magnet assembly 404 and arbor 402 may be actuated between the locking and the unlocking positions by rotation on ramp 416 which may be a screw-type thread in other embodiments. In one example, the arbor 402 may rotate on a ramp or a screw-type thread while the magnet assembly 404 remains stationary, thereby creating the separation distance Δ between the two when in an unlocking position. However, in another example, the arbor 402 may be fixed, while the magnet assembly 404 may rotate on a ramp or a screw-type thread.

Figure 7A:
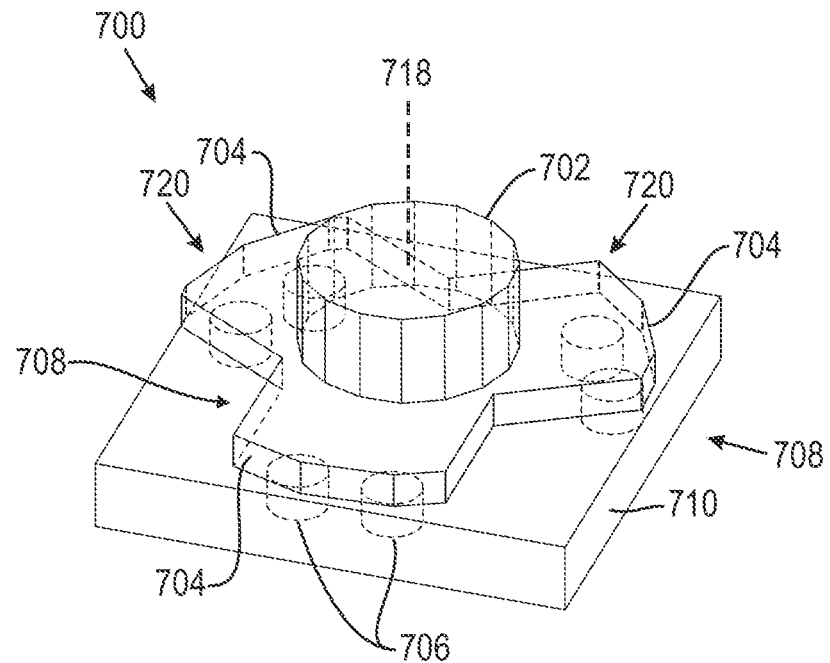
FIG. 7A is a partial perspective view of an apparatus for receiving an object, according to one embodiment.
Figure 7B:
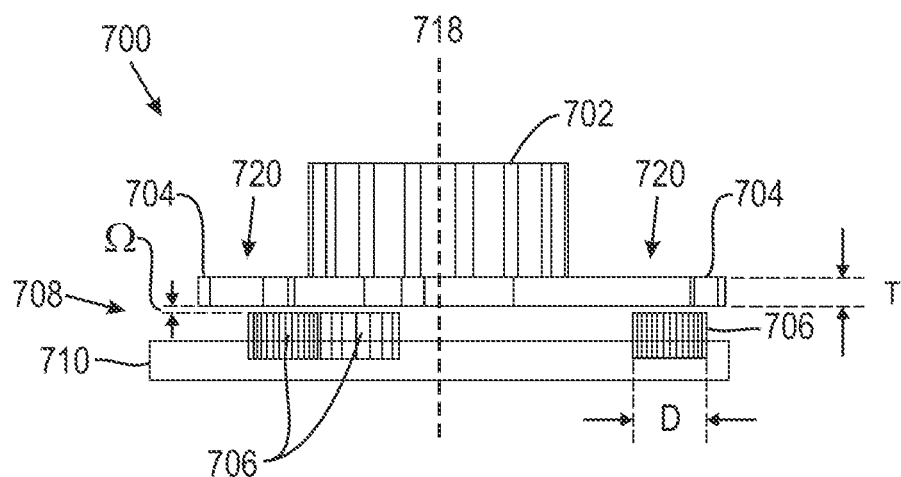
FIG. 7B is a partial side view of the apparatus in FIG. 7A.

Referring now to FIGS. 7A-7B, an apparatus 700 is depicted in accordance with an exemplary embodiment. As an option, the present apparatus 700 may be implemented in conjunction with features from any other embodiment listed herein, such as those described with reference to the other FIGS., such as FIGS. 4A-5B. However, such apparatus 700 and others presented herein may be used in various applications and/or in permutations which may or may not be specifically described in the illustrative embodiments listed herein. Further, the apparatus 700 presented herein may be used in any desired environment. Thus FIGS. 7A-7B (and the other FIGS.) should be deemed to include any and all possible permutations.

As illustrated, the apparatus 700 includes an arbor 702. The arbor 702 is preferably configured to receive an at least partially ferromagnetic object, such as a tape reel according to any of the embodiments described herein. Particularly, the arbor 702 in the present embodiment includes ferromagnetic arms 704 that extend from a center portion of the arbor 702. According to one approach, the arms 704 may correspond to the placement and/or number of permanent magnets 706 in the apparatus 700. However, in another approach, the ferromagnetic arms 704 of the arbor 702 may correspond to recessed portions in the lower surface of a tape reel. Moreover, the ferromagnetic arms 704 preferably include the same materials as the arbor 702, but is not limited thereto.

Figure 7C:
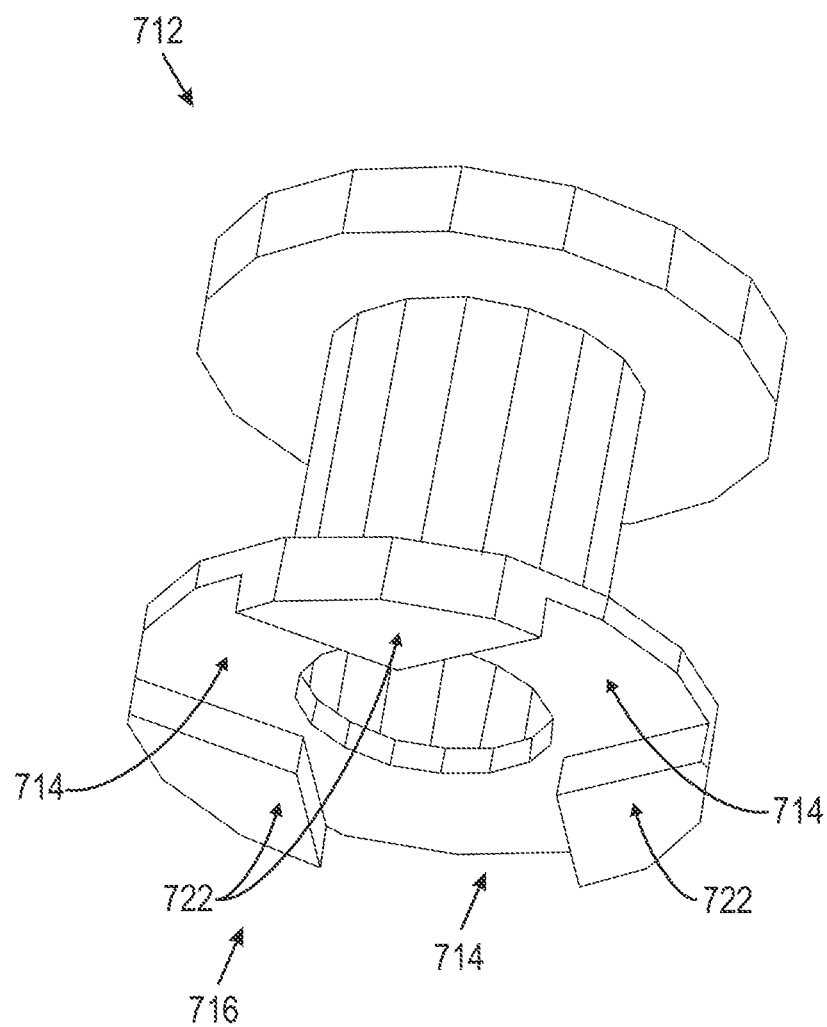
FIG. 7C is a perspective view of a tape reel according to one embodiment.

FIG. 7C illustrates a tape reel 712 in accordance with one embodiment. As an option, the present tape reel 712 may be implemented in conjunction with features from any other embodiment listed herein, such as those described with reference to the other FIGS., particularly the ferromagnetic arms 704 of FIGS. 7A-7B.

The tape reel 712 is illustrated as having recessed portions 714 as well as non-recessed portions 722 in the lower surface 716 thereof. Moreover, as discussed above, these recessed portions 714 preferably correspond to the ferromagnetic arms 704. According to the present description, "correspond to the ferromagnetic arms 704" is intended to mean that the ferromagnetic arms 704 of the arbor 702 have a shape complementary to the recessed portions 714 in the lower surface 716 of the tape reel 712. As a result, the tape reel 712 may be coupled to the arbor 702 such that the lower surface 716 of the tape reel 712 is closer to the magnetic assembly 708 than upper surfaces 720 of the ferromagnetic arms 704 when the tape reel 712 is mounted on the arbor 702 (e.g., see FIGS. 8A-8B). It follows that the dimensions of the ferromagnetic arms 704 and the recessed portions 714 are about the same. However, in other approaches, the dimensions of the recessed portions 714 may be larger than those of the ferromagnetic arms 704, depending on the desired embodiment.

Referring again to FIGS. 7A-7B, the apparatus 700 further includes a magnet assembly 708 including multiple permanent magnets 706 mounted in a soft ferromagnetic enclosure 710. In various approaches, the permanent magnets 706 and/or the soft ferromagnetic enclosure 408 may include any of the approaches described above with reference to FIGS. 4A-4B.

As illustrated, the magnet assembly 708 of FIGS. 7A-7B includes three pairs of permanent magnets 706. In preferred approaches, the permanent magnets 706 of each pair are spaced apart in a plane perpendicular to the axis 718 of rotation of the arbor 702 by a distance not less than about 1 times, more preferably not less than about 0.8 times, still more preferably not less than about 0.75 times an average of the diameters D of the permanent magnets 706 in each pair. According to an illustrative embodiment, the permanent magnets 706 may have a diameter of about 0.1 inch (about 2.54 mm) while each of the pairs may be separated by a distance of about 2.7 mm.

However, in other approaches, the magnet assembly 708 may include any number, grouping and/or orientation of permanent magnets 706 arranged according to the teachings herein. Therefore, apparatus 700 may include at least two, at least three, at least four, etc. permanent magnets mounted in the soft ferromagnetic enclosure 710, depending on the desired embodiment.

Moreover, each of the three pairs of permanent magnets 706 preferably have opposite magnetization directions. In other words, in each of the three pairs, a first of the permanent magnets 706 preferably has a magnetization in one direction along an axis of the arbor 702, while the other of the permanent magnets 706 in the pair has a magnetization in the opposite direction along an axis of the arbor 702, e.g., antiparallel to the magnetization direction of the first of the permanent magnets 706. Although the aforementioned relative magnetization orientation is not required, it is preferred as it improves the force v. distance correlation between the permanent magnets 706 and an at least partially ferromagnetic object (e.g., see tape reel 712 of FIG. 7C), as described above.

Furthermore, the soft ferromagnetic enclosure 710 is formed such that the top surface of the soft ferromagnetic enclosure 710 is recessed from the top surfaces of the permanent magnets 706. Again, although it is not required that the enclosure 710 is recessed from the top surfaces of the permanent magnets 706, it is preferred as this further improves the force v. distance correlation between the permanent magnets 706 and an at least partially ferromagnetic object. In further approaches, the ferromagnetic enclosure 710 is preferably thick enough to avoid saturation by the permanent magnets 706. However, in still other approaches, the soft ferromagnetic enclosure 710 may be about flush with the top surfaces of the permanent magnets 706 as previously described with reference to FIG. 4C.

With continued reference to FIGS. 7A-7B, the magnet assembly 708 is rotatably coupled to the arbor 702. In other words, a relative rotational movement may be induced between the magnet assembly 708 and the arbor 702 upon applying a force, e.g., using a motor that may be coupled to the arbor 702. Thus, as described above, the magnet assembly 708 and the arbor 702 may be reversibly positionable relative to one another in locking and unlocking positions upon relative rotation therebetween.

Figure 8A:
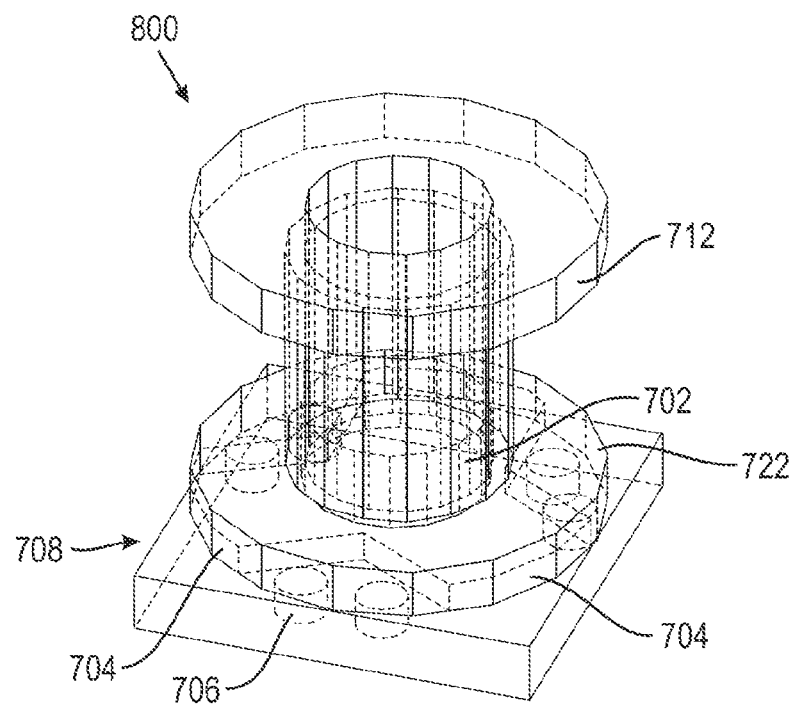
FIG. 8A is a partial perspective view of an apparatus in a locking position, according to one embodiment.
Figure 8B:
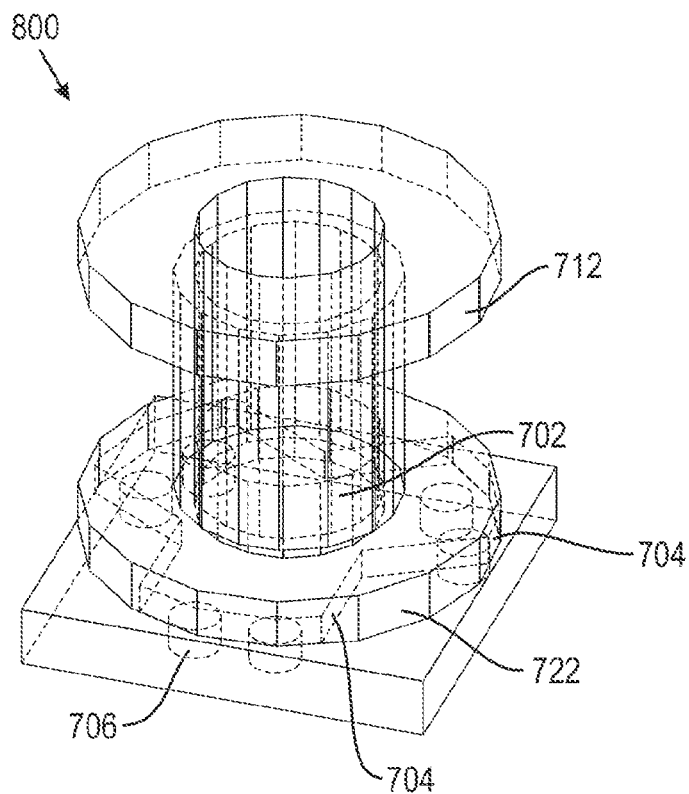
FIG. 8B is a partial perspective view of an apparatus in an unlocking position, according to one embodiment.

Looking now to FIGS. 8A-8B, the locking and unlocking positions of an apparatus 800 are illustrated, respectively, in accordance with one embodiment. As an option, the present apparatus 800 may be implemented in conjunction with features from any other embodiment listed herein, such as those described with reference to the other FIGS., such as FIGS. 7A-7C. Specifically, FIGS. 8A-8B illustrate a variation of the embodiment of FIGS. 7A-7C depicting exemplary locking and unlocking positions. Accordingly, various components of FIGS. 8A-8B have common numbering with those of FIGS. 7A-7C.

However, such apparatus 800 and others presented herein may be used in various applications and/or in permutations which may or may not be specifically described in the illustrative embodiments listed herein. Further, the apparatus 800 presented herein may be used in any desired environment. Thus FIGS. 8A-8B (and the other FIGS.) should be deemed to include any and all possible permutations.

The locking position as depicted in FIG. 8A illustrates the tape reel 712 and the arbor 702 being positioned such that the ferromagnetic arms 704 are positioned in the area between the pairs of permanent magnets 706 of the magnet assembly 708. Thus, the arms do not significantly inhibit (e.g., do not inhibit more than 25%, preferably more than 10%) the magnetic field generated by the magnet assembly from entering a ferromagnetic object disposed on the arbor when in the locking position. Moreover, the non-recessed portions 722 of the tape reel 712 are positioned above the pairs of permanent magnets 706.

Thus the non-recessed portions 722 of the tape reel 712 and the permanent magnets 706 are about in contact with each other, which desirably permits the magnet assembly 708 to lock the tape reel 712 by exerting a magnetic pulling force on the tape reel 712. It follows that when in close proximity, the permanent magnets 706 preferably exert a strong enough magnetic pulling force on the tape reel 712 to facilitate mechanical coupling therebetween, e.g., to prevent slippage and accurately control tape transport between reels (e.g., see FIG. 2).

Alternatively, the unlocking position as illustrated in FIG. 8B, permits releasing the tape reel 712 from the arbor 702 by reducing the magnetic pulling force experienced by the tape reel 712 to a lesser (negligible) force. When in the unlocking position, the tape reel 712 and the arbor 702 are positioned such that the ferromagnetic arms 704 are positioned above the pairs of permanent magnets 706 while the non-recessed portions 722 of the tape reel 712 are positioned in the area between the pairs of permanent magnets 706 of the magnet assembly 708. In the unlocking position, the ferromagnetic arms 704 at least partially block the magnetic pulling force (e.g., magnetic field) generated by the permanent magnets 706 from entering the tape reel 712. In other words, the ferromagnetic arms 704 inhibit a magnetic field generated by the magnet assembly 708 from entering the tape reel 712 when in the unlocking position. As a result, the lesser (negligible) magnetic pulling force experienced by the tape reel 712 allows for the tape reel 712 to be decoupled from the arbor 702 by an external force (e.g., see mobile robots 110 of FIG. 1A).

It follows that the thickness T (FIG. 7B) of the ferromagnetic arms 704 may vary depending on the desired embodiment. For example, the thickness T of the ferromagnetic arms 704 may be higher for embodiments having permanent magnets 706 that exert a stronger magnetic pulling force (e.g., magnetic field) than for embodiments having permanent magnets 706 that exert a weaker magnetic pulling force. According to other approaches, the thickness T of the ferromagnetic arms 704 may depend on the material(s) of the object being coupled to the arbor 702 (here a tape reel 712), the material(s) of the ferromagnetic arms 704, the separation distance Ω (FIG. 7B) between the permanent magnets 706 and the ferromagnetic arms 704 and/or the object, the amount the top surface of the ferromagnetic enclosure 710 is recessed from the top surfaces of the permanent magnets 706, etc.

The complementary shape of the ferromagnetic arms 704 and the tape reel 712 desirably reduce any lateral force required to turn the arbor 702/tape reel 712 combination with respect to the permanent magnets 706 when the tape reel 712 is mounted on the arbor 702. This may result because the two parts combined present a relatively constant magnetic environment to the permanent magnets 706 during relative rotation.

The angular displacement of the relative rotation between the locking and unlocking positions corresponds to the number of ferromagnetic arms 704 of the arbor 702 and/or the magnetic assembly 708. For example, according to the embodiment illustrated in FIGS. 8A-8B, the magnetic assembly 708 includes three pairs of permanent magnets 706 and the arbor 702 has three corresponding ferromagnetic arms 704. Assuming the pairs of permanent magnets 706 and ferromagnetic arms 704 are spaced substantially evenly, a relative rotational movement between the permanent magnets 706 and ferromagnetic arms 704 of about ⅙ a full rotation would cause a transition from a locking position and an unlocking position, or vice versa. Therefore, the angular displacement of the relative rotation between the locking and unlocking positions according to the embodiment illustrated in FIGS. 8A-8B is about 60° (i.e., (⅙)*360°).

Figure 9:
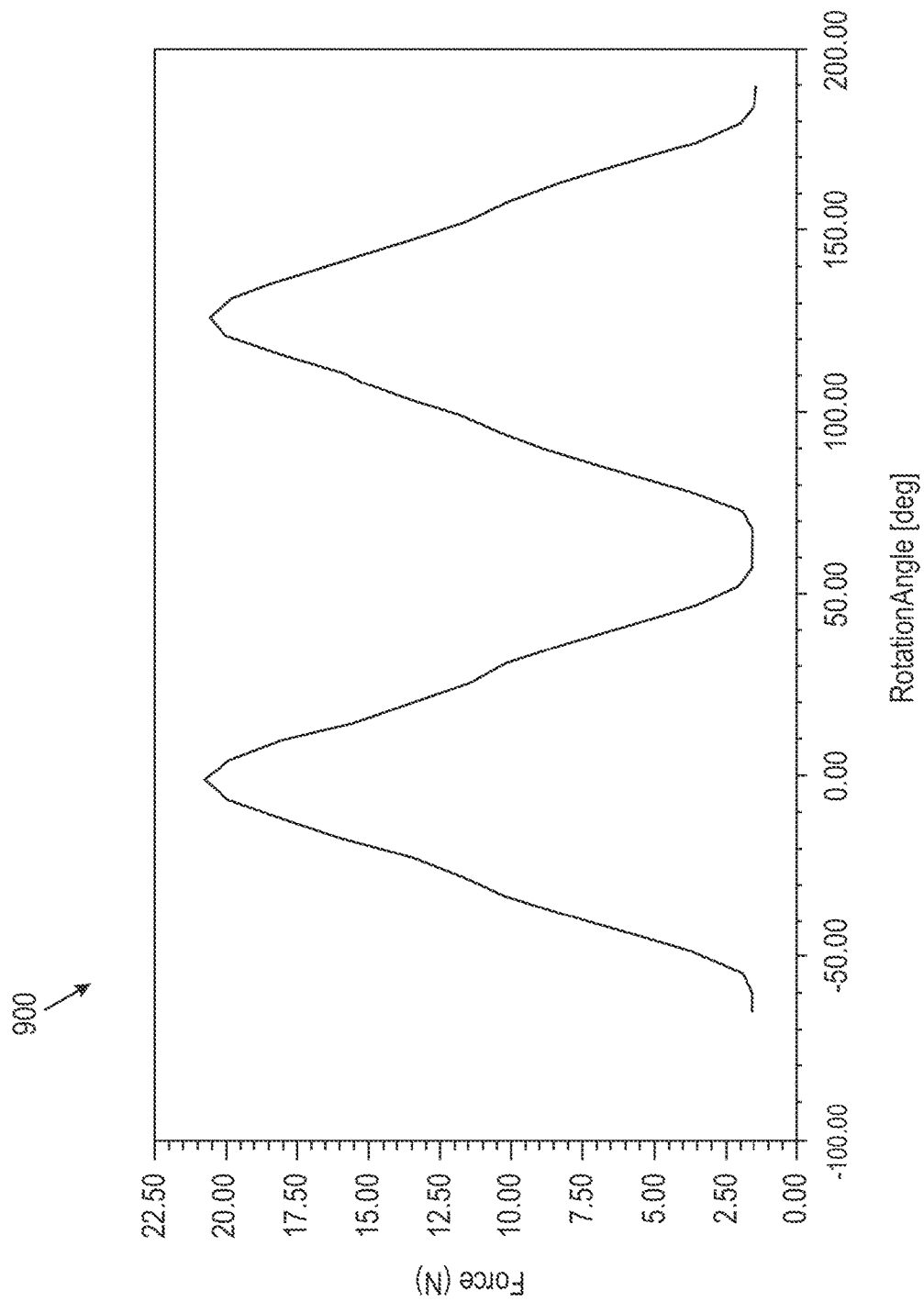
FIG. 9 is a graph plotting the magnetic force v. rotational angle correlation according to one embodiment.

Looking to FIG. 9, graph 900 plots results obtained through confirmed finite element magnetic modeling of an embodiment having similar construction to that of FIGS. 8A-8B. Accordingly, the force exerted by permanent magnets on a tape reel has been calculated as a function of the relative angle therebetween. According to the embodiment used in the modeling of graph 900, the permanent magnets had a radius of about 1.587 mm and an edge-to-edge separation of about 1.75 mm within the pairs.

As illustrated, peaks in the magnetic force "Force" center at rotational angles of about 0° and 120°, while minimum values for the magnetic force center at about −60°, 60° and 180°. It follows that, as described immediately above, the angular displacement of the relative rotation between the locking and unlocking positions is about 60° for embodiments having three pairs of permanent magnets and three corresponding ferromagnetic arms.

It should be noted that the foregoing illustrative example is in no way intended to limit the invention, but rather was introduced by way of illustration only. According to other embodiments having different numbers of ferromagnetic arms 704 and/or pairs of permanent magnets 706 (e.g., see apparatus 400 of FIG. 4B having six pairs of permanent magnets 406), the angular displacement of the relative rotation between the locking and unlocking positions may be different. The number of ferromagnetic arms 704 and/or pairs of permanent magnets 706 included in a given embodiment may be determined, at least in part, by the available space, dimensions of the permanent magnets, mechanical stability, etc. It is particularly desirable that the ferromagnetic arms 704 and/or pairs of permanent magnets 706 are spaced substantially evenly from each other (e.g., are symmetrical) to ensure stability at high speeds of rotation.

With continued reference to FIGS. 8A-8B, the arbor 702 preferably supports the tape reel 712 such that the tape reel 712 is suspended in spaced relation to the permanent magnets 706 when the tape reel 712 is mounted on the arbor 702 and the apparatus 800 is in the locking position. Thus, momentarily looking back to FIG. 7B, the separation distance Ω between the permanent magnets 706 and the ferromagnetic arms 704 is preferably maintained in a locking position. Moreover, the separation distance Ω may also be maintained in the unlocking position.

Referring again to FIGS. 8A-8B, by suspending the tape reel 712 and/or positioning the ferromagnetic arms 704 in spaced relation to the permanent magnets 706, contact is prevented between the permanent magnets 706 and the tape reel 712 and/or ferromagnetic arms 704. Thus, the tape reel 712 and ferromagnetic arms 704 are free to rotate between locking and unlocking positions without contact interference from the magnet assembly 708.

However, according to other approaches, an additional layer (not shown) may be positioned between the tape reel 712 and the permanent magnets 706, when the tape reel 712 is mounted on the arbor 702 and the apparatus 800 is in the locking position. As described above, the additional layer may protect the permanent magnets 706 and/or the soft ferromagnetic enclosure 710 from damage that may otherwise be caused by direct contact with the tape reel 712 and/or the ferromagnetic arms 704. Accordingly, the additional layer may include any material that does not compromise the magnetic properties of the magnet assembly 404. Depending on the desired embodiment, the additional layer may include any non-magnetic material which would be apparent to one skilled in the art upon reading the present description. For example, in one embodiment having an additional layer, the additional layer may include a Teflon based material.

As mentioned above, an object as referred to herein may include any at least partially ferromagnetic object. Although the object is referred to herein primarily as a tape reel, this is in no way intended to limit the invention. According to various other embodiments, the object may include parts to be held for machining, e.g., using a lathe, and/or for finishing processes, e.g., like painting. In other approaches objects may be used for holding other types of exchangeable recording media, such as magnetic disks, etc., or any other object that would be apparent to one skilled in the art upon reading the present description.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   an arbor configured to receive an at least partially ferromagnetic object; and
   a magnet assembly, the magnet assembly including multiple permanent magnets mounted in a soft ferromagnetic enclosure,
   wherein the magnet assembly is rotatably coupled to the arbor such that the magnet assembly and the arbor are positionable relative to one another in locking and unlocking positions upon relative rotation therebetween,
   wherein the magnet assembly is configured to exert a pulling force on the object in the locking position and a lesser force in the unlocking position,
   wherein the arbor includes a number of ferromagnetic arms that inhibit a magnetic field generated by the magnet assembly from entering the object when in the unlocking position.

2. The apparatus as recited in claim 1, wherein the arbor is rotatable and coupled to a motor.

3. The apparatus as recited in claim 1, wherein the arbor is configured to suspend the object in spaced relation to the permanent magnets when the object is mounted on the arbor and the apparatus is in the locking position.

4. The apparatus as recited in claim 1, wherein the arbor is configured to cause the object to contact the permanent magnets, or a layer between the object and the permanent magnets, when the object is mounted on the arbor and the apparatus is in the locking position.

5. The apparatus as recited in claim 1, wherein the magnet assembly is closer to the arbor in the locking position than in the unlocking position.

6. The apparatus as recited in claim 5, wherein the magnet assembly is actuated between the locking position and the unlocking position by rotation on a ramp or a screw-type thread.

7. The apparatus as recited in claim 5, comprising a mechanism to selectively prevent rotation of the magnet assembly during the relative rotation, wherein the arbor rotates during the relative rotation.

8. The apparatus as recited in claim 5, wherein top surfaces of the permanent magnets are flush with a top surface of the soft ferromagnetic enclosure.

9. The apparatus as recited in claim 5, wherein pairs of the permanent magnets are spaced apart by a distance not less than 0.75 times an average diameter of the permanent magnets in each pair.

10. The apparatus as recited in claim 5, wherein magnetizations of all of the permanent magnets are oriented in a same direction.

11. The apparatus as recited in claim 5, wherein magnetizations of all of the permanent magnets are oriented parallel to an axis of the arbor.

12. The apparatus as recited in claim 5, wherein the arbor is contoured to self-center the object onto the arbor.

13. The apparatus as recited in claim 1, wherein the object is a tape reel.

14. The apparatus as recited in claim 1, wherein the arbor is contoured to guide the at least partially ferromagnetic object onto the arbor.

15. The apparatus as recited in claim 1, wherein angular displacement of the relative rotation between the locking and unlocking positions corresponds to the number of ferromagnetic arms of the arbor.

16. The apparatus as recited in claim 1, wherein the magnet assembly comprises pairs of the permanent magnets that are magnetized in opposite directions, wherein the ferromagnetic enclosure is recessed with respect to surfaces of the permanent magnets facing the arbor.

17. A system comprising the apparatus as recited in claim 1 and the object, wherein the ferromagnetic arms of the arbor have a shape complementary to a lower surface of the object, such that the lower surface of the object is closer to the magnetic assembly than upper surfaces of the ferromagnetic arms when the object is mounted on the arbor.

18. The system as recited in claim 17, wherein the object is a tape reel.

19. The apparatus as recited in claim 1, comprising:
a motor coupled to the arbor;
a magnetic head;
a drive mechanism for passing a magnetic medium over the magnetic head; and
a controller electrically coupled to the motor.

20. An apparatus, comprising:
an arbor configured to receive an at least partially ferromagnetic tape reel; and
a magnet assembly having multiple permanent magnets mounted in a soft ferromagnetic enclosure,
wherein the magnet assembly is rotatably coupled to the arbor such that relative rotation therebetween causes the apparatus to move between locking and unlocking positions,
wherein the magnet assembly is configured to exert a magnetic pulling force on the tape reel in the locking position and a lesser force in the unlocking position,
wherein the arbor includes a number of ferromagnetic arms that inhibit a magnetic field generated by the magnet assembly from entering the object when in the unlocking position.

21. An apparatus, comprising:
an arbor; and
a magnet assembly rotatably coupled to the arbor, the magnet assembly including multiple permanent magnets mounted in a soft ferromagnetic enclosure,
wherein the magnet assembly and the arbor are positionable relative to one another in locking and unlocking positions upon relative rotation therebetween,
wherein a relative movement between the magnet assembly and the arbor towards and away from one another corresponds to movement between the locking and unlocking positions, respectively, wherein the arbor is configured to receive an at least partially ferromagnetic object thereon, wherein the arbor includes ferromagnetic arms that inhibit a magnetic field generated by the magnet assembly from entering the object when in the unlocking position.

22. The apparatus as recited in claim 21, wherein the arbor is contoured to guide and self-center a ferromagnetic reel onto the arbor.

23. A chucking mechanism having two positions, the first position permitting locking a ferromagnetic reel to a rotatable arbor having precision reference surfaces, and the second position permitting releasing the ferromagnetic reel from the chucking mechanism, the chucking mechanism comprising:
the arbor on which the reel is placed; and
a permanent magnet assembly being movable relative to the arbor, the permanent magnet assembly exerting a pulling force on the reel in the first position and a relatively lesser force in the second position, the permanent magnet assembly including multiple permanent magnets enclosed in a soft ferromagnetic enclosure,
wherein a relative movement between the permanent magnet assembly and the arbor towards and away from one another corresponds to movement between the first and second positions, respectively, wherein the arbor includes ferromagnetic arms that inhibit a magnetic field generated by the magnet assembly from entering the reel when in the second position.

24. The chucking mechanism as recited in claim 23, wherein at least one of the permanent magnet assembly and the arbor is actuated between the first position and the second position by rotation on a ramp or a screw-type thread.

25. The chucking mechanism as recited in claim 23, wherein the arbor is contoured to guide and self-center a ferromagnetic reel onto the arbor.

26. The chucking mechanism as recited in claim 23, wherein the arbor includes ferromagnetic arms that inhibit a magnetic field generated by the permanent magnet assembly from entering a ferromagnetic reel disposed on the arbor when in the second position, wherein the arms do not significantly inhibit the magnetic field generated by the permanent magnet assembly from entering a ferromagnetic reel disposed on the arbor when in the first position.

27. The chucking mechanism as recited in claim 26, wherein the permanent magnet assembly comprises pairs of the permanent magnets that are magnetized in opposite directions, wherein the ferromagnetic enclosure is recessed with respect to surfaces of the permanent magnets facing the arbor.

* * * * *